United States Patent Office

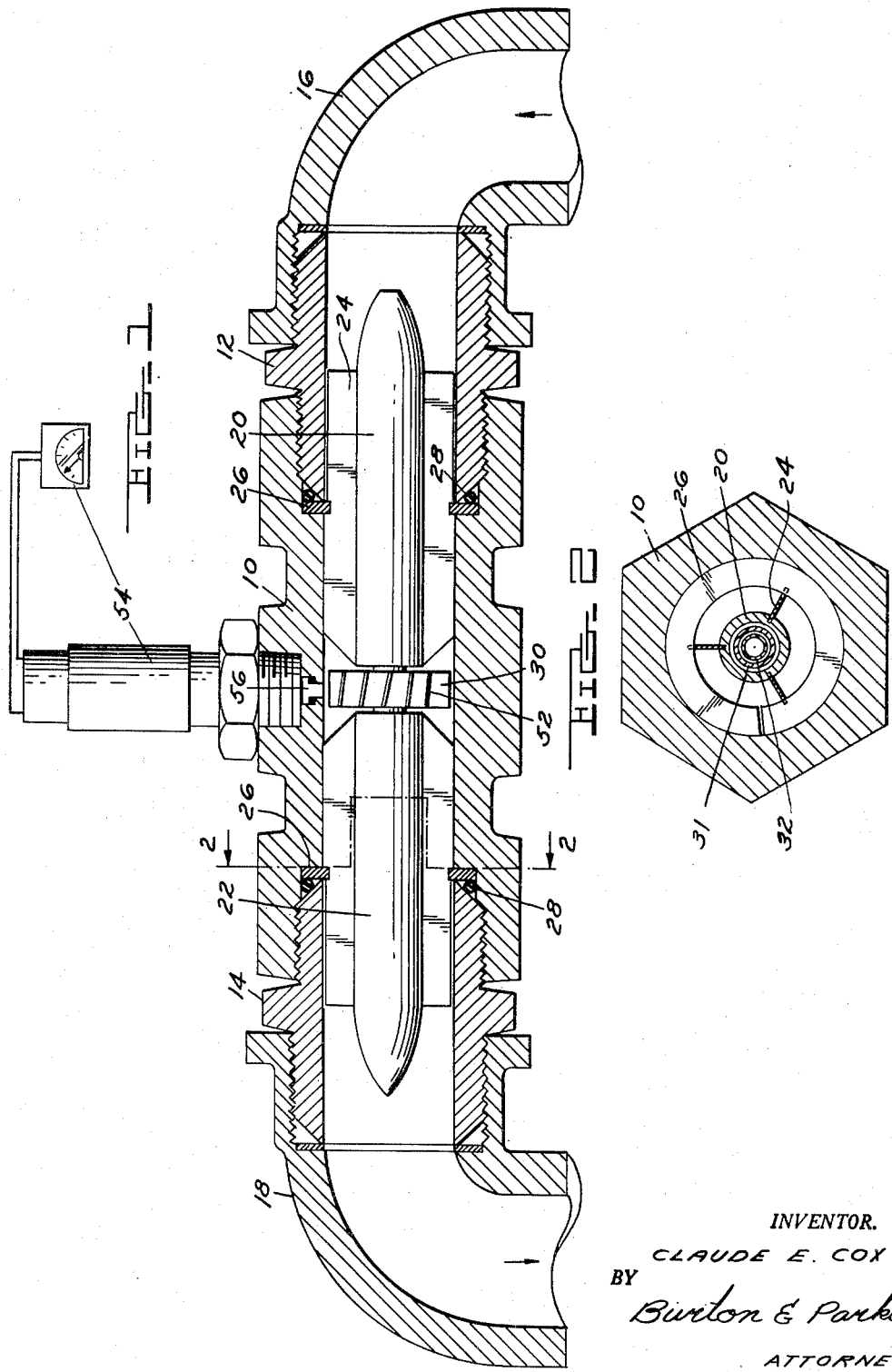

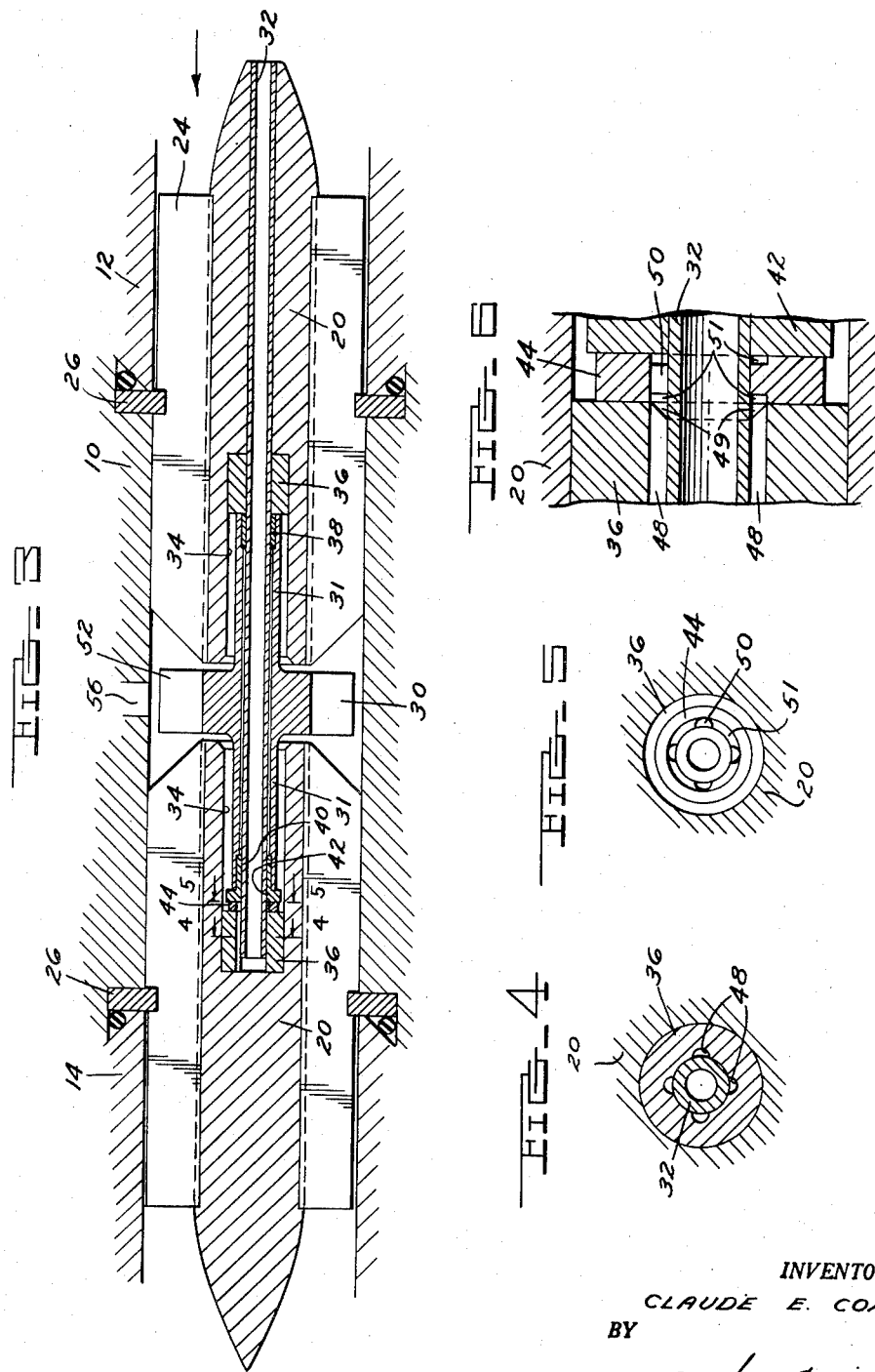

2,812,661
Patented Nov. 12, 1957

2,812,661
FLOWMETER

Claude E. Cox, Detroit, Mich., assignor to George L. Nankervis Company, Detroit, Mich., a corporation of Michigan Application November 2, 1954, Serial No. 466,344

9 Claims. (Cl. 73—231)

This invention relates to a flowmeter.

An object of the invention is to provide a flowmeter of the rotor or impeller type which may be disposed as an assembly unit within a conduit which forms a liquid passageway for the flow of liquid which it is desired to measure.

An object is to provide such an assembly of simple and inexpensive construction and one which may be readily fitted into any such conduit through which liquid is flowing and the amount of which flow it is desired to measure.

The flowmeter comprises a compact unitary assembly which is capable of being readily fitted into existing conduits to form a part thereof to measure the flow of liquid therethrough and which may be readily removed if desired.

An object of the invention is the provision of such a flowmeter structure within which the rotations of the rotor or impeller are measured in arcuate increments by conventional electronic counting mechanism.

Another object is the provision of a flowmeter of the character described wherein the downstream end thrust on the rotor is resisted and taken in part by liquid flowing through the flowmeter in such a manner that the friction of such end thrust is minimized.

More particularly an object is the provision of a flowmeter of the character set forth wherein flow-directing elements are associated with the rotor to straighten out the flow of liquid therethrough and minimize the turbulence and irregularities of such flow and wherein the upstream end of the flow-directing means is provided with an axial passageway therethrough which also extends through the rotor and from which passageway liquid is taken to resist the end thrust of the rotor.

A meritorious feature is that the flowmeter assembly includes a tubular body within which the rotor is disposed and within which flow-directing elements are disposed in line with the rotor and which flow-directing elements are supported within the body but extend beyond the ends thereof and the tubular body is itself provided with removable tubular end fittings into which the outer ends of the flow-directing elements extend but are not seated. These end fittings may be either of the internally threaded or externally threaded type so that they may be replaced as desired to adapt the assembly to being received within any suitable conduit mechanism.

The flowmeter of this invention employs a rotor means journaled between upstream and downstream flow directing means which are in turn fixedly mounted within a longitudinal bore of an outer body. The rotor means includes a rotor which is rotated by fluid passing thereby; a counter mechanism responsive to the rotation of the rotor records the fluid flow. A conduit means is provided which forms a passageway from the upstream end of the upstream flow directing means internally through the rotor to the downstream flow directing means. The rotor means includes suitable bearing means for mounting the rotor in the upstream and downstream flow directing means, and in the preferred embodiment these bearings are mounted on the conduit means. A pressure chamber is provided in the downstream flow directing means which is in fluid communication with the downstream end of the conduit means and in fluid communication with the downstream end of the rotor means for applying pressure of the fluid against the downstream end of the rotor means to resist downstream end thrust of the rotor.

Fig. 1 is a sectional view through the tubular body showing the flow-directing elements and rotor therein in elevation;

Fig. 2 is a sectional view taken on the line 2—2 of Fig. 1;

Fig. 3 is a sectional view taken on the same line as Fig. 1 but extending through the rotor and flow-directing elements;

Fig. 4 is a cross-sectional view taken on the line 4—4 of Fig. 3;

Fig. 5 is a cross-sectional view taken on the line 5—5 of Fig. 3;

Fig. 6 is a cross-sectional view taken through the upstream end of the hub of the impeller showing the parts enlarged.

As set forth this flowmeter is designed to register the flow of liquid through a conduit by means of suitable electronic counting mechanism associated with a rotatably supported rotor or impeller mounted within the body of the flowmeter. The flowmeter itself comprises an assembly which includes a tubular body indicated as 10. Opposite ends of this body are internally threaded to receive externally threaded tubular fittings 12 and 14. These fittings are shown as threadedly coupled with conduit elements 16 and 18. These fittings might be either externally or internally threaded at their outer ends so as to engage any threaded pipe member.

Supported within the tubular body are two flow-directing elements indicated by the numerals 20 and 22. In external appearance these flow-directing elements are substantially complementary. Each comprises a generally cylindrical portion provided with a plurality of ribs or fins 24. These fins are secured to the cylindrical portions in any suitable manner as by being received within channels therein as shown in Fig. 2. A plurality of these fins are shown and they are arranged circumferentially about the cylinder portions. Three such fins are shown in Fig. 2. These fins seat securely within the bore of the tubular body as shown particularly in Figs. 1 and 3. Seating in this manner they support the cylindrical portion of a flow-directing element axially within the body and with such flow-directing portion they define flow-directing passageways or channels through the body.

It will be seen in Figs. 1 and 3 that these fins 24 are of less width throughout their outer end portions which are disposed within the end fittings 12 and 14 than throughout their inner end portions which are disposed within the tubular body. The reason for this is that while the fins seat within the bore of the tubular body to position the flow-directing elements axially therein, they do not seat within the bore of the end fittings. Such end fittings might vary within manufacturing tolerances of the industry and be readily adaptable to be coupled with the tubular body and permit the flowmeter to serve its desired function. A snap ring 26 is shown as interposed between the end of each tubular end fitting and the interior of the tubular body adjacent such end. Such snap rings are received within the notches formed in the fins 24 to securely hold the flow-directing elements in place. An O sealer ring 28 is received adjacent each snap ring at the bevel ring face of the tubular end fitting to form a tight seal.

A rotor 30 is journaled between the inner ends of the flow-directing elements upon a tubular shaft 32. The tubular shaft extends through the upstream flow-directing element and opens through the outer end thereof as shown in Fig. 3. It also extends through the rotor 30 and into the inner end of the downstream flow-directing element. Each flow-directing element is provided at its inner end with a counterbore 34. Disposed within these counterbores are supporting blocks 36. These blocks embrace the tubular shaft 32 and support the same securely within the flow-directing elements 20.

The hub 31 of the rotor 30 projects in opposite directions away from the rotor itself and these relatively long hub projections are supported upon a tubular shaft by bearings. The bearing in the upstream flow-directing element is indicated as 38. The bearing in the downstream flow-directing element is indicated as 40 and such bearing has a shoulder portion 42 which overhangs the end of the hub as shown in Fig. 3. There is interposed between the shoulder 42 and the shaft-supporting block 36 and within the downstream flow-directing element, a suitable bearing disc 44 as shown in Fig. 3.

The tubular shaft-supporting block 36 within the downstream flow-directing element is provided with liquid passageways 48 extending lengthwise therethrough and alongside the tubular shaft and terminating at the upstream end in a beveled annular cutout 49 shown in Figs. 3 and 6. Four of these passageways are shown in Fig. 4. The bearing disc 44 is provided with a corresponding plurality of liquid passageways 50 as shown in Fig. 5. Such disc is also provided on opposite sides with annular channels 51 shown in Fig. 6 into which the passageways 50 enter. The liquid enters the outer end of the tubular shaft and flows therethrough, discharging therefrom into the block 36 thereby through the passageways 48 and 50 and alongside the disc 44 and of the counterbore within the downstream flow-directing element. Such liquid therefore exerts a resistance to the downstream end thrust imposed upon the rotor by the liquid flowing through the tubular body. Such liquid interposes a film of liquid alongside the bearing disc 44 that minimizes the friction of the downstream end of the hub of the rotor. It thereby serves to permit the rotor to revolve without having such a rotation varied by variations in the end thrust thereon.

The rotor itself is shown as in the form of a wheel or impeller provided with a plurality of blades 52. These blades project radially and extend generally axially of the rotor but at a slight inclination as, for example, at an angle of 20° to the axis of the rotor in whatever inclination was found most suitable.

The rotation of the rotor is measured in arcuate increments of travel by electrical impulses picked up by a conventional counter indicated as 54 and provided with a pickup part 56 which extends through the wall of the tubular body and is disposed in proximity to the revolving rotor. This counter mechanism may be of any suitable conventional satisfactory type and does not represent any novelty in the instant construction and is not specifically claimed.

In the operation of the device the fins straighten out the flow of liquid through the tubular body so that the rotor is not undesirably affected by eddies or turbulence in such liquid. The liquid which flows through the tube 32 and exerts a resistance to end thrust on the rotor minimizes the undesirable effect of such end thrust and facilitates the accurate rotation of the rotor. The rotor is accurately positioned axially within the tubular body through its support upon the tubular shaft and its mounting within the flow-directing elements as shown. The entire assembly comprises a unit which, as such, is readily adaptable to insertion within a fluid flow line.

What I claim is:

1. A flowmeter comprising, in combination, a tubular body adapted to serve as a liquid passageway, tubular end fittings removably fitted within opposite ends of the body, two flow-directing elements disposed in line within the body axially thereof and with their inner ends spaced apart and with their outer ends projecting beyond the ends of the body and into their respective end fittings, each flow-directing element having a cylindrical portion provided with radially projecting longitudinally extending fins seated within the body positioning the cylindrical portion axially thereof, said fins extending into the end fittings but not seated thereagainst, a tubular shaft extending through the upstream flow-directing element and opening through the outer end thereof and extending into the downstream flow-directing element, supporting means within each flow-directing element spaced from the inner end of each element and supporting the tubular shaft, rotor means including a rotor, said rotor means being positioned between said inner ends of said flow-directing elements and being journaled on said tubular shaft to enable rotation of said rotor, said support means within the downstream flow-directing element being cut away to provide a liquid passageway which places the downstream end of said tubular shaft in fluid communication with the downstream end of said rotor means for applying pressure of the liquid against said end to resist downstream end thrust of said rotor.

2. A flowmeter comprising, in combination, a tubular body adapted to serve as a liquid passageway, tubular end fittings removably coupled with opposite ends of the body, two flow-directing elements disposed in line within the body axially thereof and with their inner ends spaced apart and with their outer ends projecting beyond the ends of the body and into the end fittings, a tubular shaft extending through the upstream flow-directing element and into the inner end of the downstream flow-directing element, the inner end of each flow-directing element provided with a counterbore about the tubular shaft, tubular shaft-supporting blocks seated within said counterbores and embracing the shaft, a rotor means journaled upon the tubular shaft between the inner ends of the flow-directing elements, said rotor means having a hub the opposite ends of which extend into the counterbores and are provided with bearings embracing the tubular shaft, the bearing at the downstream end of the hub provided with a shoulder overlapping the end of the hub, the tubular shaft-supporting block in the downstream flow-directing element provided with a liquid passageway along the shaft for the escape of liquid from the tubular shaft at the downstream end of the rotor, said liquid passageway being in fluid communication with said shoulder for applying pressure of the liquid against said shoulder to resist downstream end thrust of said rotor means, and counter mechanism responsive to rotation of the rotor means to register arcuate increments of rotation of the rotor means.

3. A flowmeter as defined in claim numbered 2 characterized in that the flow-directing elements each includes a generally cylindrical portion provided with a plurality of radially projecting longitudinally extending fins arranged circumferentially thereabout, said fins seated against the inner wall of the tubular body supporting the cylindrical portions of the flow-directing elements axially therein, positioning rings interposed between the ends of the tubular body and the end fittings engaging the fins of the flow-directing elements, and a bearing disc supported upon the tubular shaft between the shaft-supporting block in the downstream flow-directing element and the shoulder of the hub bearing surrounding the shaft within said element, said bearing disc being provided with a liquid passageway therethrough adjacent to the tubular shaft in fluid communication with said liquid passageway in said downstream shaft-supporting block and said shoulder for applying pressure of the liquid against said shoulder to resist downstream end thrust of said rotor means.

4. A flowmeter comprising, in combination, a body having a longitudinal bore for the flow of fluid therethrough, an upstream flow-directing means and a downstream flow-directing means fixedly positioned in longitudinally spaced relationship in said bore, rotor means including a rotor, said rotor means being positioned between said upstream and said downstream flow-directing means and being mounted therein to enable rotation of said rotor within said longitudinal bore, conduit means forming a passageway from the upstream end of said upstream flow-directing means axially through said rotor to the downstream flow-directing means, said conduit means being in fluid communication with said bore at the upstream end of said upstream flow-directing means, said downstream flow-directing means having a pressure chamber in fluid communication with the downstream end of said conduit means and the downstream end of said rotor means for applying pressure of the fluid against said end to resist downstream end thrust of said rotor.

5. A flowmeter as defined in claim 4 and wherein each flow-directing means exhibits a generally cylindrical portion provided with a plurality of radially projecting longitudinally extending circumferentially spaced fins seated within the body and supporting the cylindrical portion axially within the body.

6. A flowmeter as defined in claim 5 and wherein said body has end fittings threadedly coupled with opposite ends thereof, and wherein said fins of the cylindrical portions extend into their respective end fittings without seating therein, and wherein said cylindrical portions are substantially complementary in exterior contour.

7. A flowmeter as defined in claim 4 and wherein said conduit means comprises a tubular shaft, a shaft-supporting block mounted within said downstream flow-directing means and embracing said shaft, said rotor means having a hub the opposite ends of which extend into their respective upstream and downstream flow-directing means, said ends being provided with bearings which embrace said tubular shaft, the bearing at the downstream end of the hub being provided with a shoulder overlapping the end of the hub, said shaft-supporting block being provided with a liquid passageway along the shaft in fluid communication with said pressure chamber and said shoulder for applying pressure of the liquid against said shoulder to resist downstream end thrust of said rotor.

8. A flowmeter as defined in claim 7 and wherein a bearing disc is supported upon the tubular shaft between said shaft-supporting block and said shoulder, said bearing disc having a liquid passageway in fluid communication with the liquid passageway of said shaft-supporting block and said shoulder for applying pressure of the liquid against said shoulder to resist downstream end thrust of said rotor.

9. A flowmeter comprising, in combination, a body having a longitudinal bore for the flow of liquid therethrough, an upstream flow directing means fixedly positioned axially within the bore of the body spaced from the wall thereof providing a fluid passageway through the bore along the flow directing means, rotor means including a rotor journaled axially within the bore adajacent to the downstream end of the flow directing means, a fluid pressure chamber disposed axially within the bore adjacent to the downstream end of the rotor, conduit means forming a passageway axially through the flow directing means and axially through the rotor communicating at the upstream end of the flow directing means with the bore and communicating at the downstream end of the rotor with the pressure chamber to deliver fluid thereinto, said fluid pressure chamber having a discharge communicating with the downstream end of the rotor to apply fluid pressure thereagainst to resist downstream end thrust of the rotor.

References Cited in the file of this patent

UNITED STATES PATENTS

| 1,400,523 | Chrisman | Dec. 20, 1921 |
| 2,683,224 | Cole | July 6, 1954 |

FOREIGN PATENTS

| 606,278 | Great Britain | Aug. 11, 1948 |
| 681,874 | Great Britain | Oct. 29, 1952 |